(12) United States Patent  (10) Patent No.: US 7,571,274 B2
Clayton et al.  (45) Date of Patent: Aug. 4, 2009

(54) METHOD AND SYSTEM FOR VIRTUAL ENCLOSURE MANAGEMENT

(75) Inventors: Michele M. Clayton, Scottsdale, AZ (US); Dave A. Draggon, Tempe, AZ (US); Jeffrey D. Skirvin, Mesa, AZ (US); Brian W. Skerry, Gilbert, AZ (US); Jonathan G. Wootten, Queen Creek, AZ (US)

(73) Assignee: Intel Corporation, Santa Clara, CA (US)

( * ) Notice: Subject to any disclaimer, the term of this patent is extended or adjusted under 35 U.S.C. 154(b) by 785 days.

(21) Appl. No.: 11/026,065

(22) Filed: Dec. 30, 2004

(65) Prior Publication Data

US 2006/0149881 A1  Jul. 6, 2006

(51) Int. Cl.
  *G06F 12/06* (2006.01)
  *G06F 21/00* (2006.01)
  *G06F 13/00* (2006.01)
  *G06F 13/28* (2006.01)
  *G06F 9/455* (2006.01)

(52) U.S. Cl. .................. 711/5; 711/6; 711/112; 711/114; 718/1; 710/300; 710/302

(58) Field of Classification Search .......... 711/6, 711/5, 112, 114; 718/1; 710/300, 302
See application file for complete search history.

(56) References Cited

U.S. PATENT DOCUMENTS

| | | | |
|---|---|---|---|
| 6,298,370 B1 * | 10/2001 | Tang et al. | 718/102 |
| 6,542,939 B1 * | 4/2003 | Osten et al. | 710/15 |
| 6,681,282 B1 * | 1/2004 | Golden et al. | 710/302 |
| 6,757,778 B1 * | 6/2004 | van Rietschote | 711/6 |
| 6,789,156 B1 * | 9/2004 | Waldspurger | 711/6 |
| 7,093,086 B1 * | 8/2006 | van Rietschote | 711/161 |
| 2003/0131182 A1 * | 7/2003 | Kumar et al. | 711/5 |
| 2004/0177195 A1 * | 9/2004 | Buckland et al. | 710/300 |
| 2005/0138154 A1 * | 6/2005 | Seto | 709/223 |
| 2006/0173912 A1 * | 8/2006 | Lindvall et al. | 707/104.1 |

OTHER PUBLICATIONS

VMware ESX Server, User Manual, Version 1.0, circa Jun. 2001, 152 pages.*
VMware VirtualCenter, User Manual, Version 1.0, circa Apr. 2004, 360 pages.*

* cited by examiner

*Primary Examiner*—Ronald D Hartman, Jr.
(74) *Attorney, Agent, or Firm*—Christopher K. Gagne

(57) ABSTRACT

A process and system for virtually managing enclosures. A process determines whether a system includes an enclosure processor, a virtual enclosure processor, or both an enclosure processor and a virtual enclosure processor. The process receives a command by a virtual enclosure processor if it is determined that the system includes the virtual enclosure processor. The virtual enclosure processor manages a peripheral in an enclosure. Additionally, a process activates a virtual enclosure processor in a system including a real enclosure processor. The virtual enclosure processor receives a command. The virtual enclosure processor controls a peripheral.

16 Claims, 6 Drawing Sheets

METHOD AND SYSTEM FOR VIRTUAL ENCLOSURE MANAGEMENT

BACKGROUND

1. Field

The embodiments relate to storage enclosure management, and more particularly to virtual enclosure processor management of enclosures.

2. Description of the Related Art

Computing devices (e.g., servers, computers, etc.) contain many types of devices that need specific processors to manage devices enclosed within the computing device or part of the computing device. SCSI (small computer systems interface, American National Standard for Information Technology, Project T10/1561-D, revision 10, Nov. 26, 2003, SCSI Architecture Model-3 (SAM-3)) is a commonly used parallel I/O (input/output) mechanism for computing devices. Computing devices can be interconnected with peripherals or modules along a SCSI bus or SCSI channel. A common interconnection arrangement is a daisy chain, where the bus extends out of one module into the next peripheral. The number of modules on a SCSI channel is bound by a fixed upper limit (e.g., 8, 16, etc. including the host computer).

Although ANSI (American National Standards Institute) standards documents exist for SCSI, many variations are possible and proprietary adaptations are common. For example, a SCSI-1 bus is a 50 conductor, single ended, parallel bus; a SCSI-2 bus is an extension of SCSI-1 to 68 conductors; and SCSI-3 bus is a faster, low voltage differential version of SCSI-2.

SCSI internal devices can be, for example, a disk drive, a backup tape drive, etc. External devices can also be connected to a SCSI bus. The external SCSI devices might be, for example, a printer, a scanner, etc. In a SCSI system an internal device must provide a bus termination impedance. The internal SCSI devices are typically connected by a ribbon cable with a single connector for each device. The SCSI external devices are typically connected by a series of double ended cables. An external device having an open connector (i.e., no cable attached) may be terminated with an external terminator plug (mandatory for Plug and Play SCSI) or may be terminated internally to the device. The total length of a SCSI bus to a final termination must be less than a predetermined limit so as to ensure signal integrity along the entire bus.

One or more SCSI peripheral devices may form a single SCSI enclosure. For example, a SCSI enclosure may be a collection of storage units in the same physical housing, sharing a common power supply and cooling system (including one or more fans, temperature sensors, light emitting diodes (LEDs), drive presence detection, fan controllers, power supplies, etc.). The degree of collocation of devices within an enclosure can vary depending upon the needs of an overall computer system. For example, all peripherals in a room may be treated as an enclosure. On the other extreme, a single circuit board or IC (integrated circuit) chip may be logically partitioned into several SCSI devices and the board or chip may be treated as an enclosure. A single SCSI device by itself may be an enclosure.

Typically, an enclosure defines a common environment in which there is high correlation of environmental conditions from device to device within the enclosure. An enclosure, however, need not be so constrained, and one of ordinary skill in the art would appreciate that other considerations may warrant combining and treating as an enclosure one or more peripherals that do not share a common physical environment.

SCSI devices within a SCSI enclosure may retain their logical identity as separate devices, each individually accessible by address by the host computer. On the other hand, the enclosure itself may hide the underlying devices and present a single composite device (single address) to the host computer.

Serial attached SCSI (SAS) devices (Working Draft, American National Standard, Project T10/1601-D, revision 5, Jul. 26, 2004, Information Technology, Serial Attached SCSI-1.1, (SAS-1.1)) are another type of SCSI device. SAS interconnect technology is built upon a tree topology where each device has a unique sixty-four bit identifier.

Another type of storage device is serial ATA (SATA). SATA drives are primarily designed for cost-effective bulk storage. Since SATA connector signals are a subset of SAS signals, SATA devices are fully compatible with SAS controllers. This compatibility reduces the cost and complexity of storage designs, which increases the variety of design options.

Typically, a SCSI enclosure is associated with an enclosure processor. An enclosure processor is a processor that performs monitoring and control of the enclosure. An enclosure processor typically monitors power supplies, cooling fans, doors, temperatures, and individual device locks. An enclosure processor may also control displays and a keypad or other switches on a front panel of the enclosure. Some of the hardware used to implement enclosure devices are general purpose input/output (GPIO) devices and serial GPIO devices, such as light emitting diodes (LEDs), fan controls, etc. Other enclosure devices may reside on an inter-integrated circuit (I2C) bus. All I2C bus compatible devices incorporate an on-chip interface that allows them to communicate directly with each other via the I2C bus. A particular device can be driven by the integrated circuit itself or from an external device.

An enclosure processor is a separate physical device that can reside on the SCSI bus, similar to a peripheral device, with its own unique address. In this way, a device, such as a host adapter, can command and control an enclosure processor. To facilitate communications between a host adapter and an enclosure processor, a communications protocol may be implemented on top of the SCSI protocol (e.g., Working Draft, Project T10/14-16D, revision 17, Jan. 28, 2004, Information Technology, SCSI Primary Command-3, SPC-3). Two common protocols for use with an enclosure processor on a SCSI bus are the SAF-TE (SCSI accessible fault-tolerant enclosure, SCSI Accessed Fault-Tolerant Enclosure Interface Specification, Revision 1.00, Oct. 17, 1995, et al.) and SES (SCSI enclosure specification, American National Standard for Information Technology, Working Draft SCSI Enclosure Services-2 (SES-2), Project T10/1559-D, revision 9, Jul. 22, 2004) protocols. The physical enclosure processor manages the configuration of storage drives within the enclosure or a SCSI enclosure services (SES) processor (which is also a physical processor).

BRIEF DESCRIPTION OF THE DRAWINGS

The embodiments discussed herein generally relate to a method and system for virtual management of enclosures with a virtual enclosure processor. Referring to the figures, exemplary embodiments will now be described. The exemplary embodiments are provided to illustrate the embodiments and should not be construed as limiting the scope of the embodiments.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

DETAILED DESCRIPTION

The embodiments discussed herein generally relate to a method and system for virtual management of enclosures with a virtual enclosure processor. Referring to the figures, exemplary embodiments will now be described. The exemplary embodiments are provided to illustrate the embodiments and should not be construed as limiting the scope of the embodiments.

Figure 1:
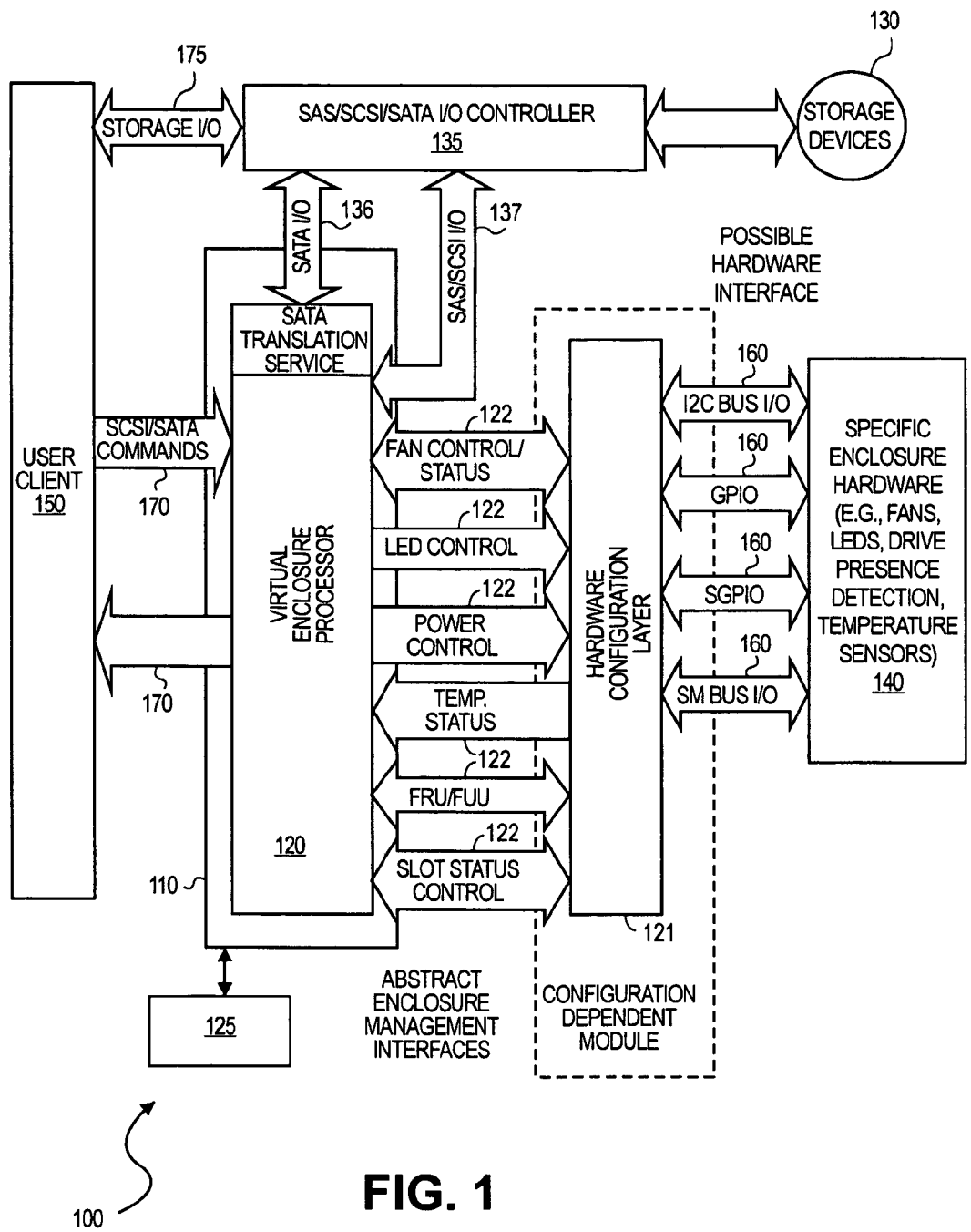
FIG. 1 illustrates one embodiment of a system including a virtual enclosure processor (VEP).

FIG. 1 illustrates an embodiment including system 100. System 100 includes processor 110 having virtual enclosure processor (VEP) logic. In one embodiment VEP 120 is a process to run in processor 110. Processor 110 can be any type of processor, for example a central processing unit (CPU), input/output (I/O) processor, etc. In one embodiment system 100 includes at least one controller 135. In one embodiment controller 135 is any combination of a small computer systems interface (SCSI) controller, a serial attached SCSI (SAS) controller, a serial advanced technology attachment (SATA) controller (sometimes written as AT attachment or integrated drive electronics (IDE), this set of standards is produced by Technical Committee T13 (www.t13.com) of the National Committee on Information Technology Standards (www.N-CITS.org), Washington, D.C.) a general purpose input/output (GPIO) controller, serial GPIO (SGPIO) controller, and a system bus input/output (SMIO) controller. Controller 135 communicates with one or more storage devices 130 over a medium, such as a bus, communication link, wireless channel, etc. In one embodiment storage devices 130 can be a SCSI, SAS, SATA, etc. storage device.

System 100 includes memory 125. In one embodiment memory 125 is a main memory, such as random-access memory (RAM), static random access memory (SRAM), dynamic random access memory (DRAM), synchronous DRAM (SDRAM), read-only memory (ROM), etc. In another embodiment, memory 125 is a cache memory. In one embodiment VEP 120 is in the form of an executable process running in processor 110 and communicating with memory 125. In one embodiment memory 125 is connected to processor 110.

System 100 communicates with user/client 150. In one embodiment user 150 is a hardware device included with system 100. In another embodiment user 150 is a hardware device that communicates with system 100 over network, bus or wireless connection 170 and bus 175 (for communicating storage input/output to/from user 150 and controller 135. In yet another embodiment, user 150 is a software process that communicates with system 100 over network, bus or wireless connection 170.

System 100 includes at least one enclosure 140. In one embodiment the at least one enclosure includes at least one peripheral device, such as storage device 130. In another embodiment enclosure 140 can include more than one enclosures 140.

System 100 further includes many buses 160 to transfer commands/information/data to/from enclosure 140. Buses 160 can be many types of buses, such as inter-integrated circuit (I2C), GPIO, SGPIO, SMIO, etc.

VEP 120 performs enclosure management processing with respect to a particular enclosure(s) 120. In one embodiment VEP 120 is presented to user 150 as an industry-standard enclosure processor device, either adhering to the SCSI Accessed Fault-Tolerant Enclosure Interface Specification (SAF-TE), or the SCSI Enclosure Services, T10 committee specification (SES) (SCSI Accessed Fault-Tolerant Enclosure Interface Specification, Revision 1.00, Oct. 17, 1995, et al.) and SES (SCSI enclosure specification, American National Standard for Information Technology, Working Draft SCSI Enclosure Services-2 (SES-2), Project T10/1559-D, revision 9, Jul. 22, 2004). VEP 120 receives commands from user 150 over bus 170. In one embodiment VEP 120 is assigned a particular address and appears as a "hardware" device to other components in system 100. VEP 120 communicates with controller 135 over a bus 136 and bus 137. VEP 120 further communicates with hardware configuration module 121 through virtual buses 122, where hardware configuration module 121 is based on specific topology information of enclosure 120. In one embodiment hardware configuration module 121 is part of VEP 120. In another embodiment, hardware configuration module 121 is a separate process.

In one embodiment VEP 120 receives commands from user 150 and looks up a table that contains corresponding control information and converts the control information into a digital signal to control elements within enclosure 140. In another embodiment VEP 120 receives information from enclosure 140 and looks up a table having corresponding signals/information data and converts the signals/information to digital signals to return to user 150 over bus 170. VEP 120 can replace a real hardware enclosure processor. User 150 "sees" VEP 120 as if VEP 120 is a real processor in system 100. Because VEP 120 is a virtual processor, multiple VEPs 120 can be added to system 100 dynamically to manage enclosures 140. Additionally, since VEP 120 is a virtual processor, a manufacturer can reduce costs by eliminating a need for another real hardware processor. Unlike a real hardware processor that can fail (e.g., overheat, break, etc.), instances of VEP 120 can be launched over and over. VEP 120 provides enclosure services within processor 110, which obviates the need for having an additional enclosure management controller.

In another embodiment a processor connected on the peripheral I2C bus 160, GPIO interface 160, SGPIO interface 160 and/or a backplane management interface can provide the necessary compute power necessary to detect, read and control enclosure 120 related peripheral devices (e.g., temperature sensors, fans, LEDs, etc.) on the buses 160 and other various peripheral interfaces. This eliminates the need to have an additional processor for controlling these peripheral devices.

In one embodiment, VEP 120 is modified or upgraded dynamically through conventional means, such as downloading, burning in of firmware, etc.

In one embodiment user interface 150 to VEP 120 covers all commands available within the relevant enclosure services specification, either the SES or SAF-TE specification. VEP 120 is addressed just as a real hardware device residing in the storage topology would be. Therefore, VEP 120 has a storage address such that it may be addressed and controlled by user 150 as any other device in system 100.

In one embodiment VEP 120 behaves as a real SES enclosure processor device in system 100, where VEP 120 is presented to a host that communicates with system 100 as having a SAS address and identified as a target device. In this embodiment the host is allowed to open a connection directly to VEP 120 and treat it like it would any other device in a storage topology.

The implementation of VEP 120 in system 100 eliminates a need for changes in a host's enclosure management application because VEP 120 performs as traditional enclosure processors.

In an embodiment having at least two VEP 120 processes in system 100 each VEP 120 manages a respective enclosure 140. In this embodiment each VEP 120 can communicate any all or subset of buses 160. In another embodiment having multiple VEPs 120 hot swapping of enclosures 140 is possible as the other VEP 120 manages an enclosure 140 that is not being swapped out. That is, since multiple VEPs 120 manage different enclosures, when one enclosure is swapped out the VEP considered remaining in system 100 still maintains management of its respective enclosure 140. In yet another embodiment, multiple VEPs 120 split management of one enclosure 140 allowing parallel processing of control of an enclosure 140. In the embodiments having multiple VEPs 120, system 100 includes a communication channel between the multiple VEPs 120. In one embodiment, the communication channel between multiple VEPs 120 is an I2C bus. It should be noted that additional VEPs 120 can be added dynamically to system 100.

Figure 2:
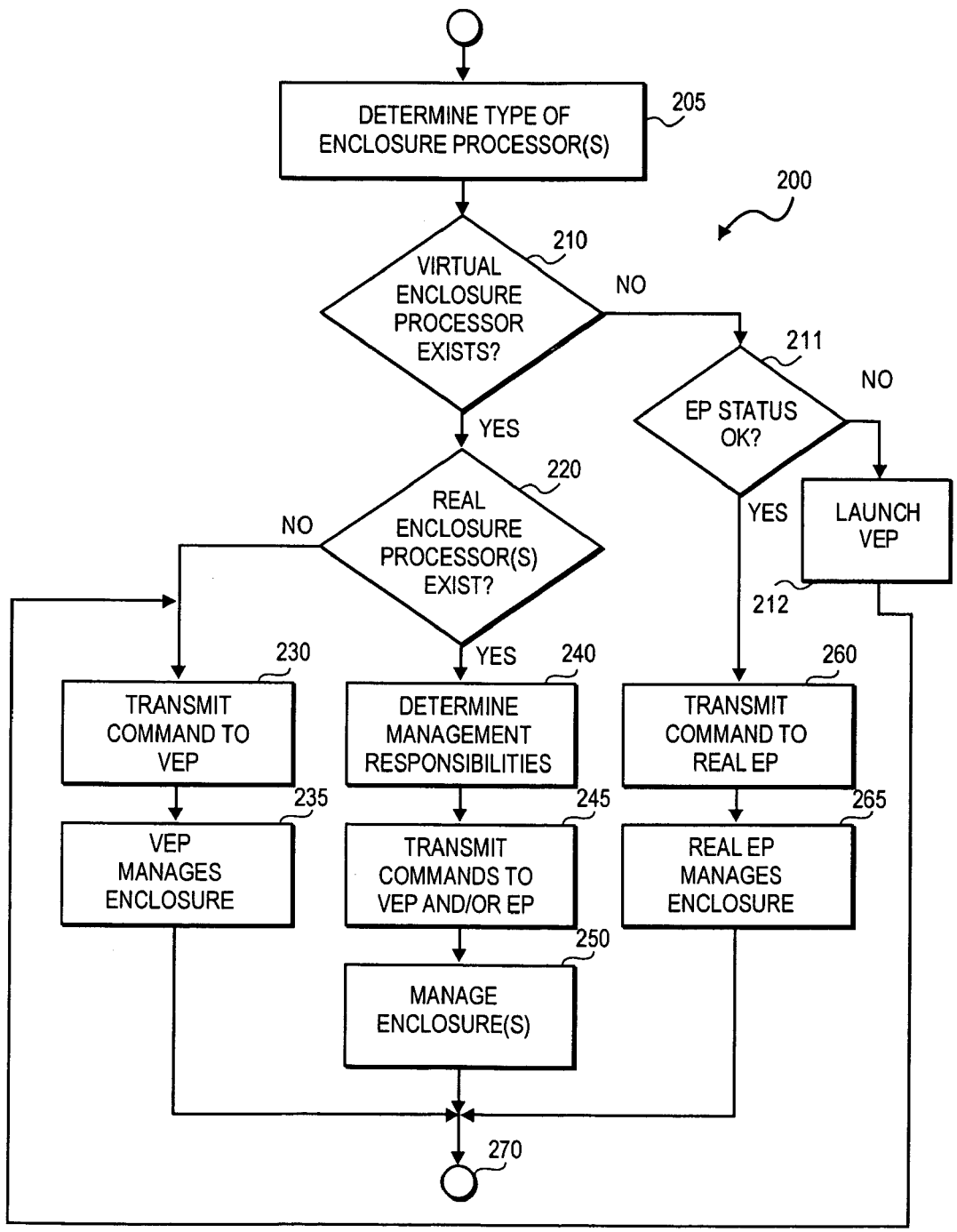
FIG. 2 illustrates an embodiment of a process.

FIG. 2 illustrates a process in block form of one embodiment. Process 200 can be implemented in a system having a real hardware enclosure processor (such as system 100 with a real hardware enclosure processor added), a VEP 120, or both a real hardware enclosure processor and a VEP 120. Process 200 begins with block 205, typically at system startup. Block 205 determines the type(s) of enclosure processors within a system or enclosure. Block 205 reads addresses of assigned enclosure processors, whether real hardware or VEP(s) 120. Once the types of enclosure processor(s) are determined (i.e., real, virtual, or both), process 200 continues with block 210.

Block 210 determines whether VEP(s) 120 exist within an enclosure or system. Block 210 checks status for any instances of VEP 120 assigned an address. If there are no VEP(s) 120 existing in a system or enclosure, process 200 continues with block 211. Block 211 assumes a real hardware enclosure processor exists in a system or enclosure and checks the status of the enclosure processor. If the enclosure processor has a healthy status (i.e., the enclosure processor is functioning correctly, responsive, etc.) process 200 continues with block 260.

In block 260 commands are transmitted to and received from the enclosure processor as usual. In block 265, the enclosure processor(s) manage its/their respective enclosures associated hardware (i.e., fans, LEDs, drive presence, temperature sensors, etc.). Process 200 continues with block 270 where process 200 completes for one cycle or iteration.

If it is determined in block 211 that the status of the enclosure processor is not healthy, process 200 continues to block 212. In block 212 an instance of at least one VEP 120 is launched. A specific address is assigned to the newly launched VEP 120. In one embodiment, the address of the unhealthy enclosure process is used. In another embodiment, all corresponding communications to the enclosure processor are modified to a new address, which is assigned to the newly launched VEP 120. Process 20 then continues with block 230. In block 230, commands are transmitted to and received from the VEP 120, in this embodiment, a newly launched VEP 120. In block 235, the VEP 120 manages its newly correlated enclosure.

If it is determined in block 210 that an instance of a VEP 120 exists, process 200 continues with block 220. Block 220 determined whether a real hardware enclosure processor(s) exist in the system or enclosure. If it is determined that a real hardware enclosure processor exists (along with at least one instance of a VEP 120), process 200 continues with block 240.

In block 240 management responsibilities are assigned to VEP(s) 120 and the enclosure processor(s). In the case where VEP(s) 120 are assigned tasks typically handled by the enclosure processor(s) already in the enclosure or system, VEP 120 traps on those commands (i.e., intercepts commands to from the address assigned to the enclosure processor and handles the commands that are transmitted to/from the assigned enclosure tasks. In this embodiment, management tasks between VEP9s) 120 and a real hardware enclosure processor (s) can be split to improve performance. In another embodiment, management tasks are not divided between a real hardware enclosure processor and VEP(s) 120.

Process 200 continues with block 245 where commands are transmitted to/from a real hardware enclosure processor and instances of VEP 120. Process 200 continues with block 250 where all enclosures in a system are managed by both the real hardware enclosure processor and instance of VEP 120.

If block 220 determines that no real hardware enclosures exist in a system or enclosure, process 200 continues to blocks 230 and 235 as discussed above, albeit with respect to an existing instance of VEP(s) 120.

It should be noted that the addition of instances of VEP(s) 120 can be dynamic or static. That is, process 200 can dynamically launch instances of new VEP(s) 120 if necessary. Therefore, when a real hardware enclosure processor fails, a VEP 120 can be launched to take the place of a non-responsive or failed enclosure processor, or added to split management responsibilities of an enclosure(s). In another embodiment, an instance of VEP 120 can be manually launched in a system as necessary to increase performance (i.e., splitting enclosure management with an existing hardware enclosure processor, an existing instance of VEP 120, or both).

Figure 3:
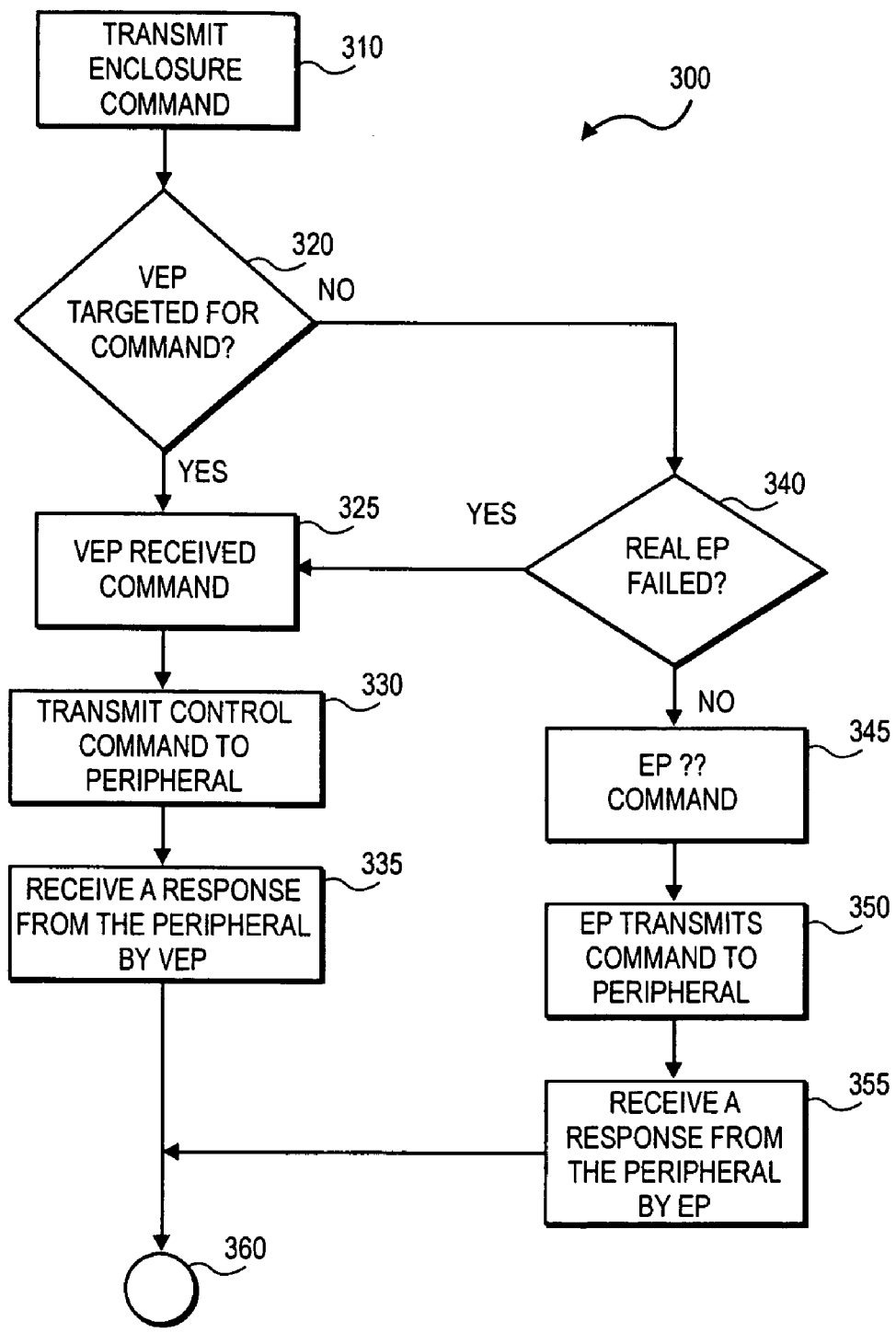
FIG. 3 illustrates another embodiment of a process.

FIG. 3 illustrates another embodiment of a process in block form. Process 300 begins with block 310 where an enclosure command(s) is/are transmitted to an enclosure processor, whether a real hardware enclosure processor or a VEP 120. That is, in this embodiment, it is transparent to a user what type of enclosure processor exists in a system or enclosure. Therefore, the same standards are employed by a user, such as user 150 to communicate with an enclosure processor. The transmitted command(s) can arise from a user, a controller, such as controller 135, or an enclosure, such as enclosure 140. Once block 310 transmits a command(s), block 320 determines whether the command is targeted for an instance of a VEP 120 based on the assigned address and status of whether an instance of VEP 120 is running in a system or enclosure. If block 320 determines that the command(s) are not targeted for a VEP 120, process 300 continues with block 340.

Block 340 determines whether a real hardware enclosure processor has failed or is unresponsive. If it is determined that a real hardware enclosure processor is functioning properly, process 300 continues with block 345. Block 345 determines the type of enclosure processor command. After block 345 completes, the real hardware enclosure processor transmits a command(s) to a peripheral in its associated enclosure in block 350. Process 300 continues with block 35 where a response is received from the enclosure hardware to the real hardware enclosure processor.

If block 320 determines that a VEP 120 is targeted for a command(s) or if block 340 determines a real hardware enclosure processor is failed or non-responsive, process 300 continues with block 325. In block 325, a VEP 120 receives the command targeted to its specifically assigned address (e.g., similarly to hardware in the storage topology). VEP 120 interprets the command through correlating signals with data using, for example lookup tables. Process 300 continues with block 330 where VEP 120 transmits a command(s) to an enclosure hardware device (e.g., fans, LEDs, drive presence detection devices, temperature sensors, etc.). Process 300 continues with block 335 where a response(s) is received by VEP 120 from the enclosure. Process 300 continues with 360 where process 300 waits for a next command(s) at block 310.

Figure 4:
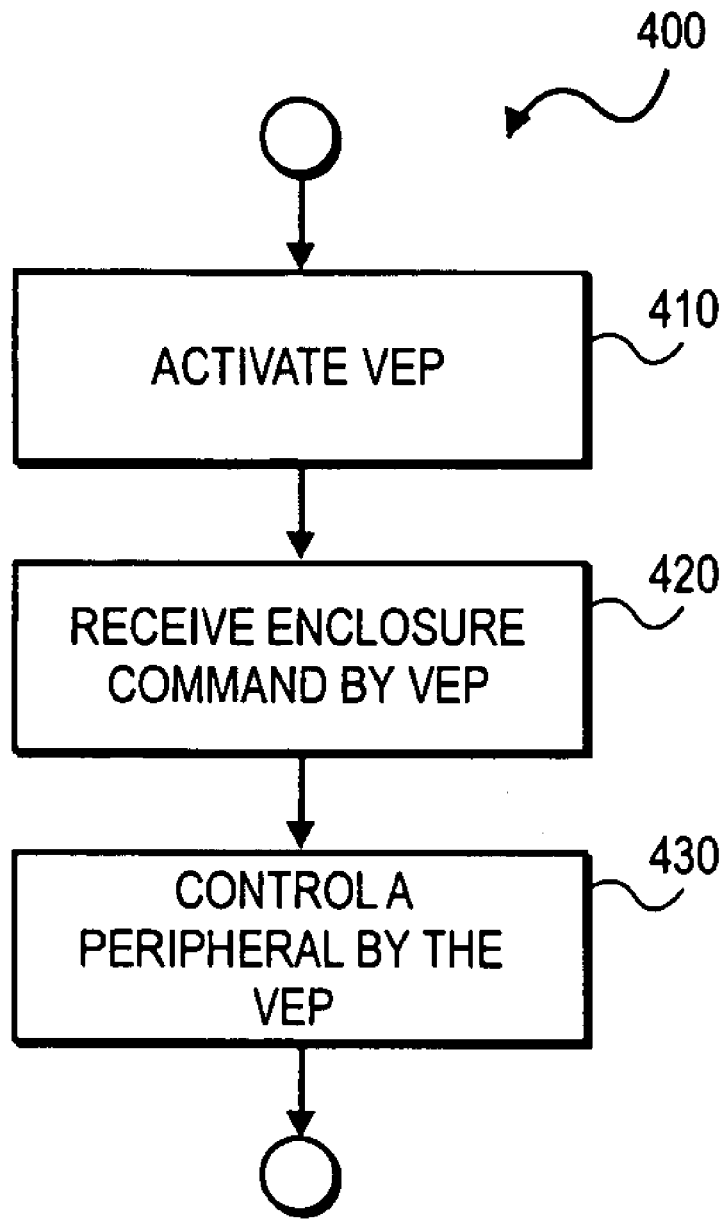
FIG. 4 illustrates yet another embodiment. Of a process.

FIG. 4 illustrates an embodiment of a process in block form. Process 400 begins with block 410. In block 410 a system, such as system 100, activates VEP 120. VEP 120 can be activated by known processing means, such as launching of a thread, executing a process at a specific point of execution of a processor (e.g., startup, predetermined time period, receipt of a specific signal, etc.).

In block 420 VEP 120 receives a command(s) targeted to its assigned address. In one embodiment, a typical address that is assigned to a real hardware enclosure processor is used as the assigned address for the VEP 120. In block 430 VEP 120 controls/manages a correlating enclosure and its associated hardware functionality. In one embodiment, many VEPs 120 (e.g., 2, 3, 4, etc.) can be activated in block 410 to control/manage many enclosures. In one embodiment, VEP(s) 120 is/are activated dynamically during a system that is running, as necessary (e.g., addition of a new enclosure during plug-and-play, hot-swapping, etc.). In another embodiment, VEP(s) 120 is/are activated at startup only.

Figure 5:
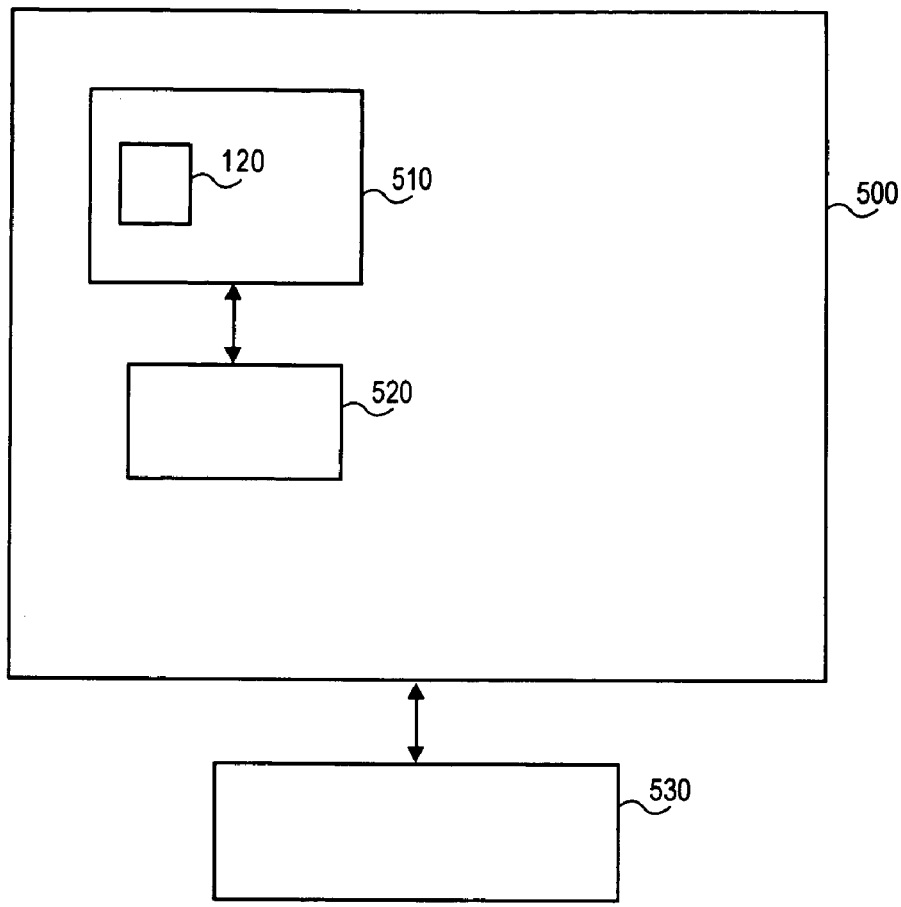
FIG. 5 illustrates another embodiment of a system with a VEP.

FIG. 5 illustrates another system of an embodiment including VEP 120. System 500 includes processor 510. In one embodiment, processor 510 is a CPU. In another embodiment, processor 510 is an I/O processor. It should be noted that other processors can be included in system 500 in addition to processor 510. In one embodiment VEP 120 resides within processor 510.

System 500 includes memory 520 and enclosure 530. Memory 520 is similar to memory 125. Enclosure 530 is similar to enclosure 140. System 500 is suitable for disposition in a computing environment, such as a server, host/client computer, etc.

Figure 6:
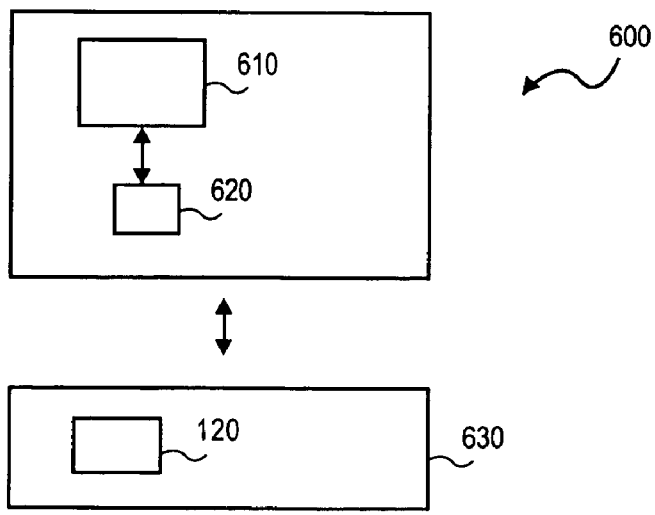
FIG. 6 illustrates a system with a VEP included in an enclosure.

FIG. 6 illustrates another system of an embodiment including VEP 120 disposed in an enclosure 630. System 600 includes processor 610, such as a CPU, I/O processor, etc. Memory 620 is coupled to processor 610. Memory 620 is similar to memory 125. Enclosure 630 is attached to system 600 and includes VEP 120 disposed within enclosure 630. Enclosure 630 is similar to enclosure 140 with the addition of VEP 120.

Figure 7:
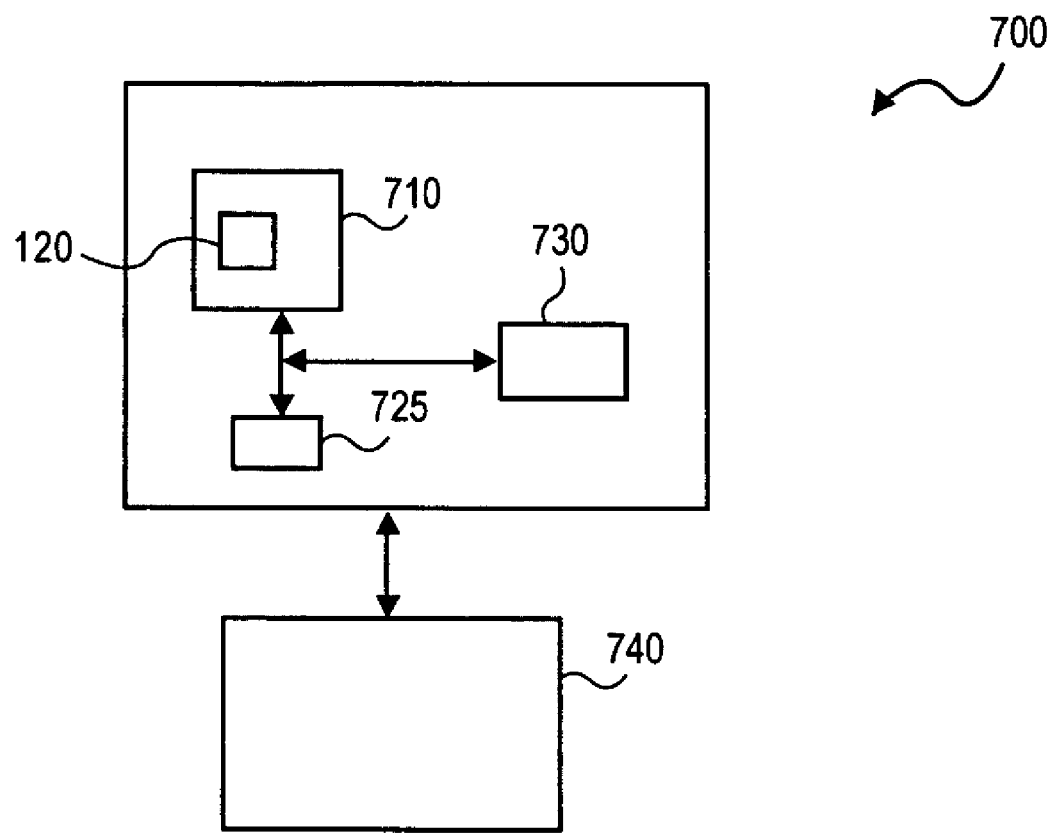
FIG. 7 illustrates a system with a real enclosure processor and a VEP.

FIG. 7 illustrates an embodiment of a system including at least one real enclosure processor in addition to one or more VEPs 120. System 700 includes processor 710 including one or more instances of VEP 120, memory 725, enclosure processor 730 and enclosure 740. Enclosure processor 730 manages at least one enclosure, such as enclosure 740. It should be noted that more than one enclosure can be coupled to system 700 where the more than one enclosure are managed by either VEP 120, enclosure processor 730 or both enclosure processor 730 and VEP 120. In another embodiment, VEP 120 and enclosure processor 730 can be disposed with an enclosure, such as enclosure 740. Enclosure 740 is similar to enclosure 140. Memory 725 is similar to memory 125.

The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:
   a plurality of processors;
   at least one memory, the at least one memory being coupled to at least one of the plurality of processors;
   at least one enclosure, the at least one enclosure including at least one peripheral device;
   a plurality of internal buses, each internal bus being capable of being connecting to the at least one peripheral;
   at least one virtual enclosure processor, the at least one virtual enclosure processor including an enclosure management process, the enclosure management process being to perform enclosure processing with respect to the enclosure, the at least one virtual enclosure processor being presented to a user as a standard enclosure processor device that adheres to an enclosure services standard specification;
   wherein if the system also comprises an actual hardware enclosure processor to perform the enclosure processing with respect to the enclosure, the at least one virtual enclosure processor is launched to take the place of the actual hardware enclosure processor in performing the enclosure processing if the actual hardware enclosure processor fails.

2. The system of claim 1, wherein the at least one enclosure management process is to perform enclosure processing with respect to respective peripherals connected to each of the respective plurality of internal buses.

3. The system of claim 1 further comprising:
a second virtual enclosure processor, the second virtual enclosure processor including another enclosure management process, wherein the second virtual enclosure processor is to perform enclosure processing with respect to a first peripheral connected to a first of the plurality of internal buses and with respect to a second peripheral connected to a second of the plurality of internal buses.

4. The system of claim 3, wherein the at least one virtual enclosure processor is to perform enclosure processing with respect to respective peripherals connected to a respective first subset of the plurality of internal buses, and the second virtual enclosure processor is to perform enclosure processing with respect to respective peripherals connected to a respective second subset of the plurality of internal buses.

5. The system of claim 3 further comprising:
a communication channel between the at least one virtual enclosure processor and the second virtual enclosure processor.

6. The system of claim 5, wherein the communication channel is an inter-integrated circuit (I2C) bus.

7. The system of claim 1, further comprising:
a plurality of peripherals, each peripheral being connected to one of the plurality of internal buses.

8. The system of claim 7, wherein the peripherals are storage devices.

9. The system of claim 1, further comprising additional virtual enclosure processors to be added to the system dynamically.

10. A system comprising:
a computer processing unit (CPU);
at least one memory, the at least one memory being coupled to the CPU;
at least one enclosure, the at least one enclosure including at least one peripheral device;
at least one actual hardware enclosure processor, the at least one actual hardware enclosure processor being to perform enclosure processing with respect to the at least one enclosure;
a plurality of internal buses, each internal bus being capable of being connecting to the at least one peripheral; and
at least one virtual enclosure processor, the at least one virtual enclosure processor including an enclosure management process, the enclosure management process being to perform the enclosure processing with respect to the enclosure, the at least one virtual enclosure processor being presented to a user as a standard enclosure processor device that adheres to an enclosure services standard specification;
wherein the at least one virtual enclosure processor is launched to take the place of the at least one actual hardware enclosure processor in performing the enclosure processing if the at least one actual hardware enclosure processor fails.

11. The system of claim 10, wherein the at least one virtual enclosure processor monitors the at least one actual hardware enclosure processor to determine status.

12. The system of claim 10, wherein the at least one virtual enclosure processor is to perform enclosure processing with respect to respective peripherals connected to each of the respective plurality of internal buses.

13. The system of claim 10, further including an inter-integrated circuit (I2C) bus.

14. The system of claim 10, further comprising:
a plurality of peripherals, each peripheral being connected to one of the plurality of internal buses.

15. The system of claim 10, wherein the peripherals are storage devices.

16. The system of claim 10, further comprising additional virtual enclosure processors to be added to the system dynamically.

* * * * *